(12) United States Patent
Chen

(10) Patent No.: US 7,880,858 B2
(45) Date of Patent: Feb. 1, 2011

(54) LIQUID CRYSTAL LENS AND LENS MODULE HAVING SAME

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 383 days.

(21) Appl. No.: 12/198,300

(22) Filed: Aug. 26, 2008

(65) Prior Publication Data

US 2009/0268152 A1   Oct. 29, 2009

(30) Foreign Application Priority Data

Apr. 25, 2008  (CN) .................... 2008 1 0301314

(51) Int. Cl.
*G02F 1/13* (2006.01)
*G02B 3/00* (2006.01)
*G02B 15/14* (2006.01)

(52) U.S. Cl. .................. 349/200; 359/654; 359/702

(58) Field of Classification Search ............... 349/200; 359/654, 702; 977/932
See application file for complete search history.

(56) References Cited

U.S. PATENT DOCUMENTS

| | | | | |
|---|---|---|---|---|
| 7,489,381 B2* | 2/2009 | Sekiguchi | .................. | 349/142 |
| 7,619,713 B2* | 11/2009 | Hashimoto | .................. | 349/200 |
| 7,630,040 B2* | 12/2009 | Liu et al. | .................. | 349/123 |
| 7,738,344 B2* | 6/2010 | Ooi et al. | .................. | 369/112.02 |
| 7,773,489 B2* | 8/2010 | Murata et al. | .................. | 369/112.02 |
| 2006/0198760 A1* | 9/2006 | Potyrailo et al. | .................. | 422/82.01 |
| 2006/0278866 A1* | 12/2006 | Star | .................. | 257/17 |
| 2008/0136990 A1* | 6/2008 | Kimura | .................. | 349/46 |

* cited by examiner

*Primary Examiner*—Mike Qi
(74) *Attorney, Agent, or Firm*—Andrew C. Cheng

(57) ABSTRACT

A liquid crystal lens includes a first light-pervious plate, second light-pervious plate opposite to the first light-pervious plate, a first electrode layer on the first light-pervious plate, a second electrode layer on the second light-pervious layer, a liquid crystal layer and a driving voltage unit. The first electrode layer includes a plurality of concentric, annular electrodes and is comprised of carbon nanotubes. The liquid crystal layer is sandwiched between the first and second light-pervious plates. The liquid crystal layer includes a plurality of annular regions spatially corresponding to the respective annular electrodes. A density of liquid crystal in the annular regions of the liquid crystal layer is different from each other. The driving voltage unit is configured for providing voltages between each of the annular electrodes and the second electrode layer for creating a gradient distribution of refractive index of the liquid crystal layer in radial directions.

13 Claims, 4 Drawing Sheets

LIQUID CRYSTAL LENS AND LENS MODULE HAVING SAME

CROSS-REFERENCE TO RELATED APPLICATIONS

This application is related to commonly-assigned copending application entitled, Liquid Crystal Lens and Lens Module Incorporating Same, filed on Aug. 26, 2008, application Ser. No. 12/198,298. Disclosures of the above identified applications are incorporated herein by reference.

BACKGROUND

1. Technical Field

This invention relates to lenses and, particularly, to a liquid crystal lens with a variable focal length and a lens module having the same.

2. Description of Related Art

At present, image pick-up devices such as video cameras are widely used. The image pick-up device includes a lens module. The lens module is configured for focusing light onto an image sensor. The lens module includes lenses and a lens barrel for holding the lenses. A complicated bulky motor is used to move lenses during focusing.

What is needed, therefore, is a lens with a variable focal length and a lens module having the same.

SUMMARY

A liquid crystal lens includes a first light-pervious plate, second light-pervious plate opposite to the first light-pervious plate, a first electrode layer, a second electrode layer, a liquid crystal layer and a driving voltage unit. The first electrode layer includes a plurality of concentric, annular electrodes arranged on the first light-pervious plate. The first electrode layer is comprised of carbon nanotubes. The second electrode layer is arranged on the second light-pervious layer. The liquid crystal layer is sandwiched between the first light-pervious plate and the second light-pervious plate. The liquid crystal layer includes a plurality of annular regions spatially corresponding to the respective annular electrodes. A density of liquid crystal in the annular regions of the liquid crystal layer is different from each other. The driving voltage unit is configured for providing voltages between each of the annular electrodes and the second electrode layer for creating a gradient distribution of refractive index of the liquid crystal layer in radial directions.

Other advantages and novel features of the present lens will become more apparent from the following detailed description of preferred embodiments, when taken in conjunction with the accompanying drawings.

BRIEF DESCRIPTION OF THE DRAWINGS

Many aspects of the present liquid crystal lens and lens module can be better understood with reference to the following drawings. The components in the drawing are not necessarily drawn to scale, the emphasis instead being placed upon clearly illustrating the principles of the present liquid crystal lens and lens module. Moreover, in the drawings, like reference numerals designate corresponding parts throughout the several views.

DETAILED DESCRIPTION OF PRESENT EMBODIMENTS

Embodiments of the present liquid crystal lens and lens module will now be described in detail below and with reference to the drawings.

Figure 1:
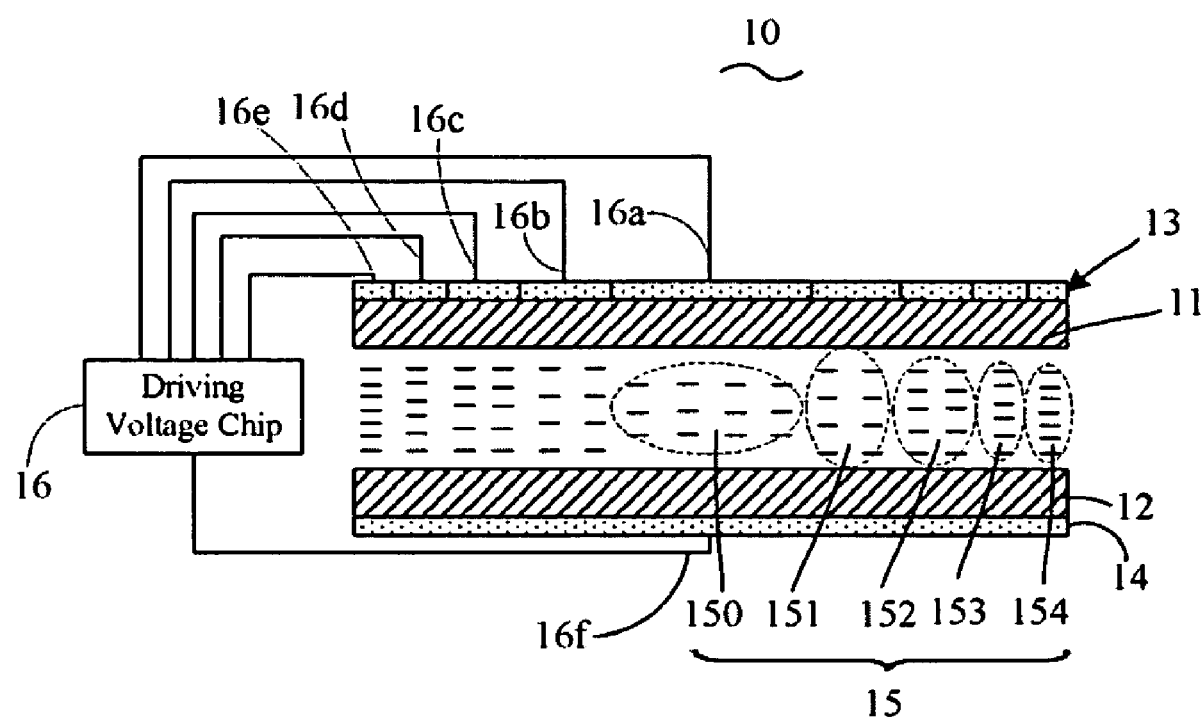
FIG. 1 is schematic, cross-sectional view of a liquid crystal lens in accordance with a first exemplary embodiment.

Referring to FIG. 1, a liquid crystal lens 10 is shown in accordance with a first exemplary embodiment. The liquid crystal lens 10 includes a first base plate 11, a second base plate 12, a first electrode layer 13, a second electrode layer 14, a liquid crystal layer 15, and a driving voltage unit 16. The liquid crystal layer 15 is filled between the first base plate 11 and the second base plate 12. In the exemplary embodiment, the first electrode layer 13 is arranged on one surface of the first base plate 11 facing away from the liquid crystal layer 15. The second electrode layer 14 is arranged on one surface of the second base plate 12 facing away from the liquid crystal layer 15.

A material of the first base plate 11 and the second base plate 12 is a light-pervious material, e.g. glass and light-pervious plastic. A thickness of the first base plate 11 and the second base plate 12 is in the range from about 0.1 millimeter (mm) to about 0.5 mm, and preferably from about 0.2 mm to 0.4 mm.

The first base plate 11 is located substantially parallel with the second base plate 12. The first base plate 11 is spaced apart from the second base plate 12 by a distance in the range from 10 microns to about 100 microns, and preferably from about 30 microns to 70 microns. The liquid crystal layer 15 is located between the first base plate 11 and the second base plate 12. If no voltage is applied between the first base plate 11 and the second base plate 12, the liquid crystal molecules of the liquid crystal layer 15 are oriented in parallel with the first base plate 11 and the second base plate 12.

Figure 2:
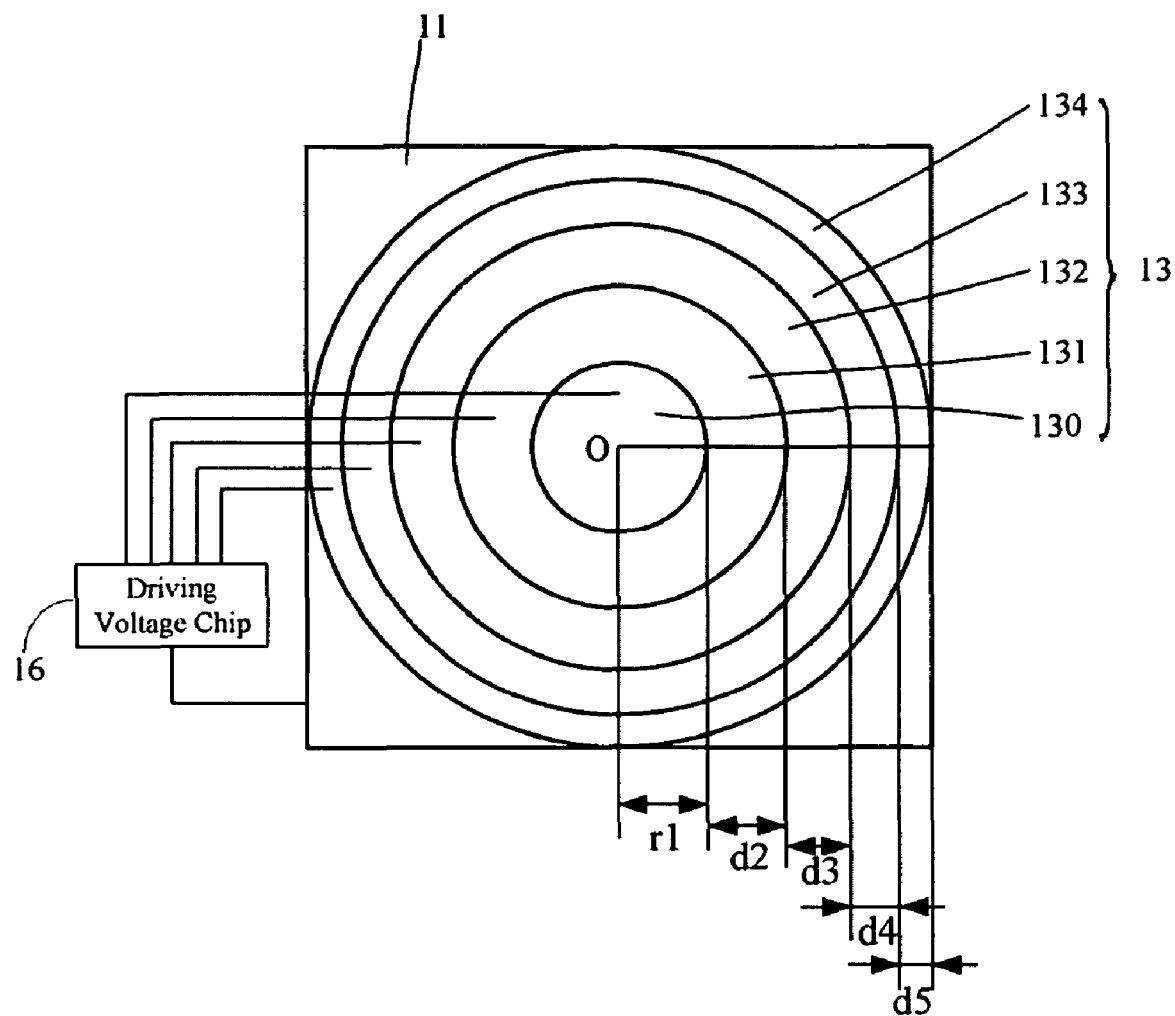
FIG. 2 is schematic, plan view of the liquid crystal lens in FIG. 1.

Referring to FIG. 2, the first electrode layer 13 includes a round electrode 130, four annular electrodes 131, 132, 133, 134 with a same center O. The round electrode 130, the four annular electrodes 131, 132, 133, 134 are aligned in the order written outwardly from the center O. In practical use, a total number of the round electrode 130 plus the annular electrodes 131, 132, 133, 134 may be more than 5. Preferably, the total number of the round electrode 130 plus the annular electrodes 131, 132, 133, 134 is in the range from 5 to 20, and further preferably in the range from 7 to 15 so that the liquid lens 10 can have both properties of good optical performance and being easily manufactured. A thickness of the electrode layer 13 may be in the range from 50 nanometers to 500 nanometers, and preferably in the range from 100 nanometers to 300 nanometers.

The round electrode 130 has a radius r1. The annular electrodes 131, 132, 133, 134 have widths d2, d3, d4, d5, respectively. Preferably, the radius r1 and the widths d2, d3, d4, d5 satisfy $r1>d2>d3>d4>d5$. In the exemplary embodiment, each two adjacent electrodes of the round electrodes 130 and the annular electrodes 131, 132, 133, 134 substantially abut against each other and are electrically insulated from one another by insulating glue. In alternative embodiments, each two adjacent electrodes of the round electrodes 130 and the annular electrodes 131, 132, 133, 134 may be spaced apart from each other by a tiny space.

The second electrode layer 14 is a planar electrode. In use, voltages will be applied between the round electrode 130 and the second electrode layer 14, the annular electrode 131 and the second electrode layer 14, the annular electrode 132 and the second electrode layer 14, the annular electrode 133 and the second electrode layer 14, the annular electrode 134 and the second electrode layer 14, respectively.

Both of the first electrode layer 13 and the second electrode layer 14 are comprised of a carbon nanotube material. The carbon nanotube material can be selected from a group consisting of single-walled carbon nanotube, multi-walled carbon nanotube, single-walled carbon nanotube bundles, multi-walled carbon nanotube bundles and super-aligned multi-walled carbon nanotube yarns. The first electrode layer 13 is formed on the surface of the first base plate 11 by, but not limited to, a photo-mask process.

The liquid crystal layer 15 is divided into five regions, i.e. a round region 150, a first annular region 151, a second annular region 152, a third annular region 153, and a fourth annular region 154. The round region 150, the first annular region 151, the second annular region 152, the third annular region 153, and the fourth annular region 154 are located between the first electrode layer 13 and the second electrode layer14, and corresponding to the round electrode 130, and the annular electrode 131, 132, 133 134, respectively. In the exemplary embodiment, the densities of liquid crystal in the round region 150, the first annular region 151, the second annular region 152, the third annular region 153, and the fourth annular region 154, gradually increase one after another, in ethe order written. It is to be understood that the densities of the liquid crystal in the round region 150, the first annular region 151, the second annular region 152, the third annular region 153, and the fourth annular region 154, can also gradually decrease one after another, in the order written.

The driving voltage unit 16 has five cathode terminals 16*a*, 16*b*, 16*c*, 16*d* and 16*e*, and an anode terminal 16*f*. The five cathode terminals 16*a*, 16*b*, 16*c*, 16*d* 16*e* are electrically connected with the round electrode 130, the annular electrode 131, 132, 133, 134, respectively. The anode terminal 106*f* is electrically connected with the second electrode layer14. The driving voltage unit 16 is configured for providing voltages respectively between the first round electrode 130 and the second electrode layer 14, the annular electrode 131 and the second electrode layer 14, the annular electrode 132 and the second electrode layer 14, the annular electrode 133 and the second electrode layer 14, and the annular electrode 134 and the second electrode layer 14.

In operation, voltages are applied between the first electrode layer 13 and the second electrode layer 14 by the driving voltage unit 16. The voltages between the round electrode 130 and the second electrode layer 14, the annular electrode 131 and the second electrode layer 14, the annular electrode 132 and the second electrode layer 14, the annular electrode 133 and the second electrode layer 14, the annular electrode 134 and the second electrode layer 14, are controlled separately by the driving voltage unit 16. All of the voltages are larger than a threshold voltage of the liquid crystal layer 15, so the liquid crystal molecules of the liquid crystal layer 15 in the round region 150, the first annular region 151, the second annular region 152, the third annular region 153, and the fourth region 154 can be turned to form an angle between the liquid crystal molecules and the first base plate 11 or the second base plate 12. If the voltages are controlled appropriately, the angles between the liquid crystal molecules and the first base plate 11 or the second base plate 12 may be distributed in radial gradient from the center of the round electrode 130.

A refractive index of the liquid crystal layer 15 increases as the angle contained by the lengthwise orientation of the liquid crystal molecules of the liquid crystal layer 15 and the transmission direction of the light passing through the liquid crystal layer 15 increases. In the exemplary embodiment, the transmission direction of the light passing through the liquid crystal layer 15 is perpendicular to the first base plate 11 or the second base plate 12. When the lengthwise orientation of the liquid crystal molecules of the liquid crystal layer 15 is parallel with the transmission direction of the light passing through the liquid crystal layer 15, the refractive index of the liquid crystal layer 15 has a minimum value. When the lengthwise orientation of the liquid crystal molecules of the liquid crystal layer 15 is perpendicular to the transmission direction of the light passing through the liquid crystal layer 15, the refractive index of the liquid crystal layer 15 has a maximum value.

Therefore, applying proper voltages between the round electrode 130 and the second electrode layer 14, the annular electrode 131 and the second electrode layer 14, the annular electrode 132 and the second electrode layer 14, the annular electrode 133 and the second electrode layer 14, the annular electrode 134 and the second electrode layer 14 may make the angles contained by the lengthwise orientation of the liquid crystal molecules and the transmission direction of the light passing through the liquid crystal layer 15 be distributed in radial gradient from the round region 150 to the fourth annular region 154 one after another. Thus the refractive indexes of the round region 150, the first annular region 151, the second annular region 152, the third annular region 153 and the fourth annular region 154 are distributed in radial gradient in the order written, thus the liquid crystal lens 10 forms a gradient-index lens.

The radial gradient of the refractive indexes can vary by varying the refractive indexes of the liquid crystal 15. The focal length of the liquid crystal lens 10 is determined by the radial gradient of the refractive indexes. Therefore, the focal length can vary by controlling the voltages between the round electrode 130 and the second electrode layer 14, the annular electrode 131 and the second electrode layer 14, the annular electrode 132 and the second electrode layer 14, the annular electrode 133 and the second electrode layer 14, the annular electrode 134 and the second electrode layer 14.

When the refractive indexes of the liquid crystal layer 15 decreases in radial gradient from the round region 150 to the fourth annular region 154, the liquid crystal lens 10 is a positive lens. When the refractive indexes of the liquid crystal layer 15 increases in radial gradient from the round region 150 to the fourth annular region 154, the liquid crystal lens 10 is a negative lens.

It is understood that the round electrode 130 can be replaced by an annular electrode. Under this situation, the liquid crystal lens 10 can form a gradient-index lens if proper voltages are applied to the liquid crystal molecules between the annular electrodes of the first electrode layer and the second electrode layer to make the refractive indexes of the liquid crystal layer 15 in radial gradient.

In the present embodiment, the focal length of the liquid crystal lens 100 is variable, so that there is no need for a motor to drive lenses to move. When the liquid crystal lens 100 is applied to a lens module, the size of the lens module is reduced. This adapts to the development trend of minimizing the electronic products. Additionally, the carbon nanotube has a nanoscale size and good conductivity of light and electricity thus, the liquid crystal lens 100 applying the carbon nanotube as electrodes can be used in miniature optic-electronic products, for example a camera unit of a mobile phone.

Figure 3:
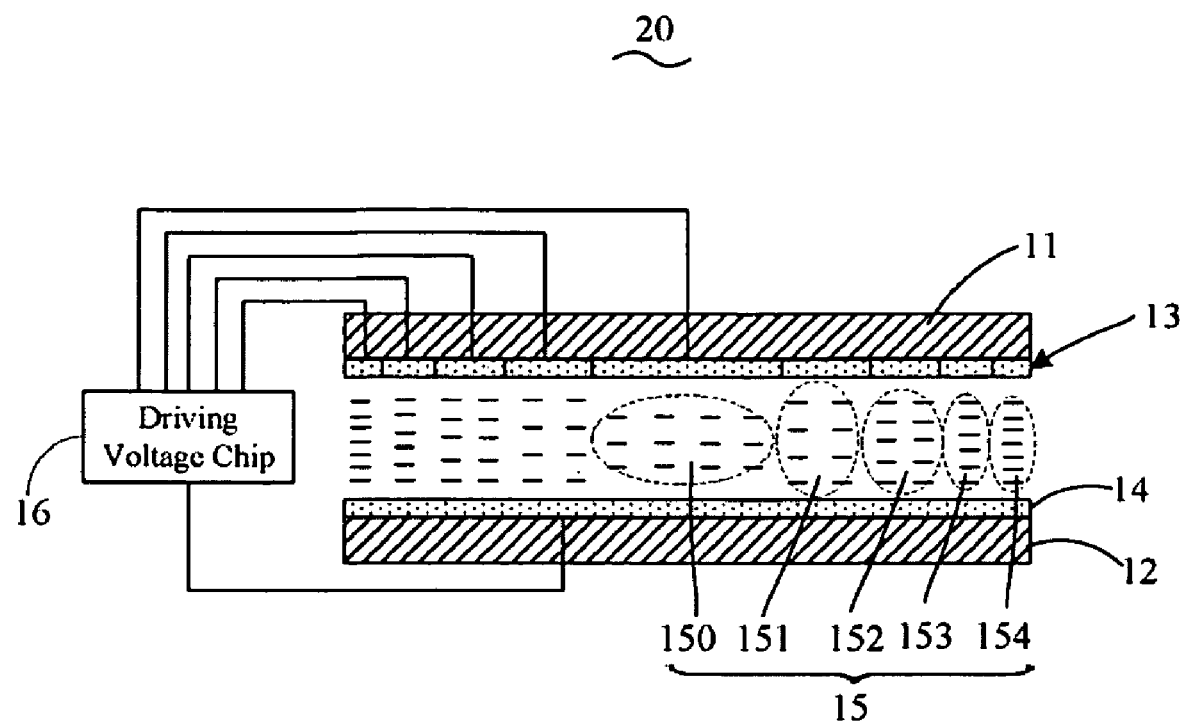
FIG. 3 is schematic, cross-sectional view of a liquid crystal lens in accordance with a second exemplary embodiment.

Referring to FIG. 3, a liquid crystal lens 20 is illustrated in accordance with a second exemplary embodiment. The distinguished features between the liquid crystal lens 20 and the liquid crystal lens 10 are that the first electrode layer 13 and the second electrode layer 14 are arranged on a surface of the first base plate 11 and a surface of the second base plate 12 adjacent to the liquid crystal layer 15, respectively. In this exemplary embodiment, the first electrode layer 13 can also be arranged on the surface of the first base plate 11 facing away from the liquid crystal layer 15. Alternatively, the second electrode layer 14 can be arranged on the surface of the second base plate 12 facing away from the liquid crystal layer 15.

Figure 4:
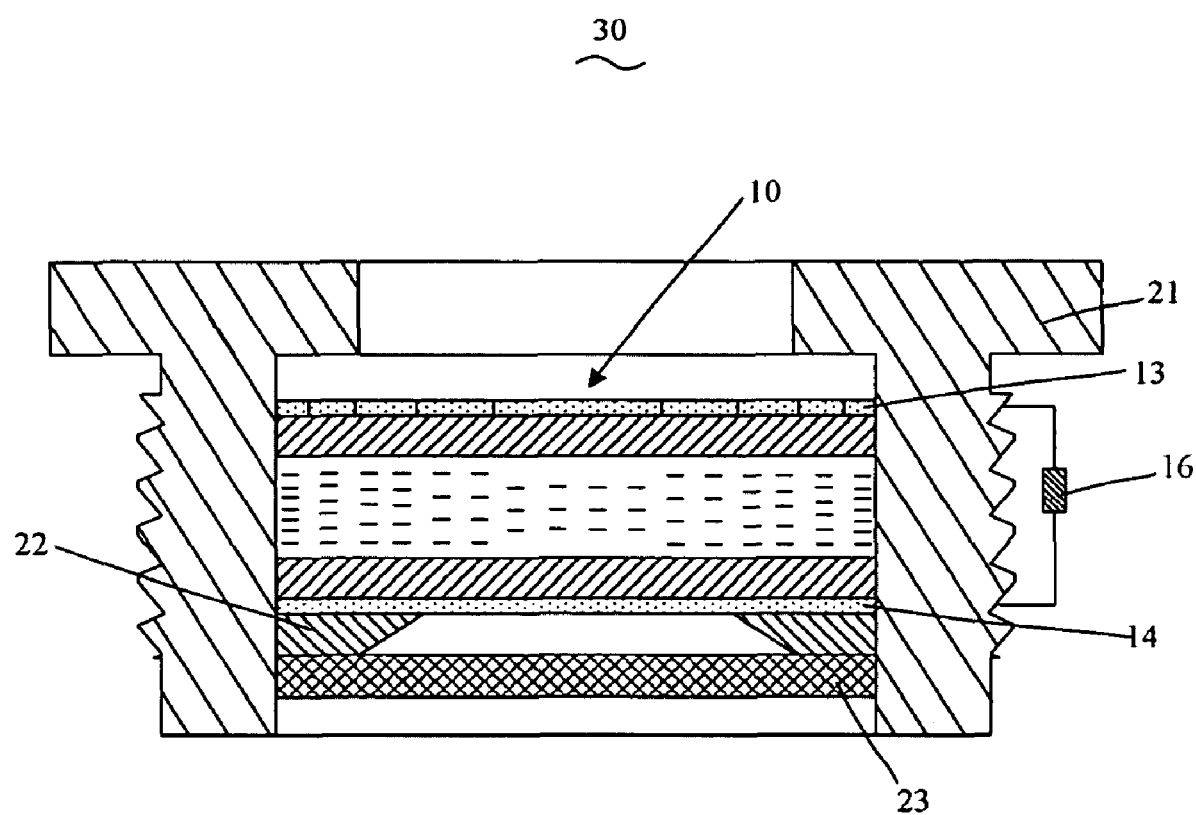
FIG. 4 is schematic, cross-sectional view of a lens module incorporating the liquid crystal lens in FIG. 1 in accordance with a third exemplary embodiment.

Referring to FIG. 4, a lens module 30 having the liquid crystal lens 10 is illustrated in accordance with a third exemplary embodiment. The lens module 30 includes a lens barrel 21, a liquid crystal lens 10 and an infrared-ray cut filter 23. The liquid crystal lens 10 and the infrared-ray cut filter 23 are engagingly received in the lens barrel 21 and aligned in the order written. The liquid crystal lens 10 is spaced apart from the infrared-ray cut filter 23 by a spacer 22. The liquid crystal lens 10 includes a driving voltage unit 16. The driving voltage unit 16 is electrically connected with the first electrode layer 13 and the second electrode layer 14. The driving voltage unit 16 is configured for providing proper voltages between the round electrode 130 and the second electrode layer 14, the annular electrode 131 and the second electrode layer 14, the annular electrode 132 and the second electrode layer 14, the annular electrode 133 and the second electrode layer 14, the annular electrode 134 and the second electrode layer 14 to make the refractive indexes of the round region 150, the first annular region 151, the second annular region 152, the third annular region 153 and the fourth annular region 154 in radial gradient. All of the voltages are larger than the threshold voltage of the liquid crystal layer 15.

In the lens module 30, there is no need for the motor to drive the lenses, thus the size of the lens module 30 is reduced. This adapts for the development trend of minimizing the electronic products.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A liquid crystal lens, comprising:
   a first light-pervious plate;
   a second light-pervious plate opposite to the first light-pervious plate;
   a first electrode layer comprising a plurality of concentric, annular electrodes arranged on the first light-pervious plate, the first electrode layer being comprised of carbon nanotubes;
   a second electrode layer arranged on the second light-pervious layer;
   a liquid crystal layer sandwiched between the first light-pervious plate and the second light-pervious plate, the liquid crystal layer comprising a plurality of annular regions spatially corresponding to the respective annular electrodes, a density of liquid crystal in the annular regions of the liquid crystal layer being different from each other; and
   a driving voltage unit for providing voltages between each of the annular electrodes and the second electrode layer for creating a gradient distribution of refractive index of the liquid crystal layer in radial directions.

2. The liquid crystal lens as claimed in claim 1, wherein the first electrode layer further comprises a round electrode concentric with the plurality of annular electrodes, the diameter of the round electrode is smaller than the interior diameter of the innermost annular electrode.

3. The liquid crystal lens as claimed in claim 2, wherein the total number of the round electrode and annular electrodes is in the range from 5 to 20.

4. The liquid crystal lens as claimed in claim 1, wherein a width of the annular electrodes decreases in the radial directions from a center to a periphery of the first electrode layer.

5. The liquid crystal lens as claimed in claim 1, wherein a density of the liquid crystal in the annular regions gradually increases or decreases in radial directions from a center to a periphery of the liquid crystal layer.

6. The liquid crystal lens as claimed in claim 1, wherein the total number of the round electrode and annular electrodes is in the range from 7 to 15.

7. The liquid crystal lens as claimed in claim 1, wherein a thickness of the first electrode layer is in the range from 50 nanometers to 500 nanometers.

8. The liquid crystal lens as claimed in claim 1, wherein a thickness of the first electrode layer is in the range from 100 nanometers to 300 nanometers.

9. The liquid crystal lens as claimed in claim 1, wherein the carbon nanotube is selected from a group consisting of single-walled carbon nanotube, multi-walled carbon nanotube, single-walled carbon nanotube bundles, multi-walled carbon nanotube bundles and super-aligned multi-walled carbon nanotube yarns.

10. A lens module, comprising:
    a lens barrel; and
    a liquid crystal lens engagingly received in the lens barrel, the liquid crystal lens comprising:
      a first light-pervious plate;
      a second light-pervious plate opposite to the first light-pervious plate;
      a first electrode layer comprising a plurality of concentric, annular electrodes arranged on the first light-pervious plate, the first electrode layer being comprised of carbon nanotubes;
      a second electrode layer arranged on the second light-pervious layer;
      a liquid crystal layer sandwiched between the first light-pervious plate and the second light-pervious plate, the liquid crystal layer comprising a plurality of annular regions spatially corresponding to the respective annular electrodes, a density of liquid crystal in the annular regions of the liquid crystal layer being different from each other; and
      a driving voltage unit for providing voltages between each of the annular electrodes and the second electrode layer for creating a gradient distribution of refractive index of the liquid crystal layer in radial directions.

11. The lens module as claimed in claim 10, wherein the first electrode layer further comprises a round electrode concentric with the plurality of annular electrodes, the diameter of the round electrode is smaller than the interior diameter of the innermost annular electrode.

12. The lens module as claimed in claim 10, wherein a width of the annular electrodes decreases in the radial directions from a center to a periphery of the first electrode layer.

13. The lens module as claimed in claim 10, wherein the carbon nanotube is selected from a group consisting of single-walled carbon nanotube, multi-walled carbon nanotube, single-walled carbon nanotube bundles, multi-walled carbon nanotube bundles and super-aligned multi-walled carbon nanotube yarns.

* * * * *